US010936732B2

(12) United States Patent
Kenyon et al.

(10) Patent No.: US 10,936,732 B2
(45) Date of Patent: Mar. 2, 2021

(54) SYSTEM AND METHOD FOR REGISTERING MULTI-PARTY CONSENT

(71) Applicant: Guardtime IP Holdings Ltd., Tortola (VG)

(72) Inventors: Anthony Kenyon, Farnham (GB); Hema Krishnamurthy, Phoenix, AZ (US)

(73) Assignee: Guardtime SA, Lausanne (CH)

( * ) Notice: Subject to any disclaimer, the term of this patent is extended or adjusted under 35 U.S.C. 154(b) by 395 days.

(21) Appl. No.: 16/048,331

(22) Filed: Jul. 29, 2018

(65) Prior Publication Data
US 2020/0034553 A1 Jan. 30, 2020

(51) Int. Cl.
*G06F 21/60* (2013.01)
*H04L 9/32* (2006.01)

(52) U.S. Cl.
CPC .......... *G06F 21/604* (2013.01); *H04L 9/3247* (2013.01); *G06F 2221/2101* (2013.01); *G06F 2221/2117* (2013.01); *H04L 2209/38* (2013.01)

(58) Field of Classification Search
CPC ......... G06F 2221/2101; G06F 21/6218; G06F 21/604; G06F 2221/2117; H04L 9/3239; H04L 2209/38; H04L 9/3297; H04L 9/3247
See application file for complete search history.

(56) References Cited

U.S. PATENT DOCUMENTS

| 7,076,558 B1* | 7/2006 | Dunn | G06F 21/6218 709/225 |
|---|---|---|---|
| 2019/0306128 A1* | 10/2019 | Kothavale | H04L 63/0421 |
| 2020/0042625 A1* | 2/2020 | Balaraman | G06F 16/258 |
| 2020/0117818 A1* | 4/2020 | Latka | G06F 12/1466 |

* cited by examiner

*Primary Examiner* — Baotran N To
(74) *Attorney, Agent, or Firm* — Jeffrey Pearce

(57) ABSTRACT

Multi-party consent to performance of an action is securely registered by receiving from at least one consent requesting entity (CRE) a consent action request (CAR), which is matched with a consent policy. The policy may specify a plurality of consent voting entities (CVE), and direct confirmation of registration of an identity of each CVE in a blockchain. A consent request (CR) may then be issued to the CVEs. Consent request responses (CRRs) from the CVEs are then compared with at least one condition in the consent policy. A representation of a state of the CRRs relative to the consent policy is registered in the blockchain. If the policy condition(s) is satisfied, a subject entity may be signaled to perform the action corresponding to the CAR, and a state indication of performance of the action may also be registered in the blockchain.

52 Claims, 1 Drawing Sheet

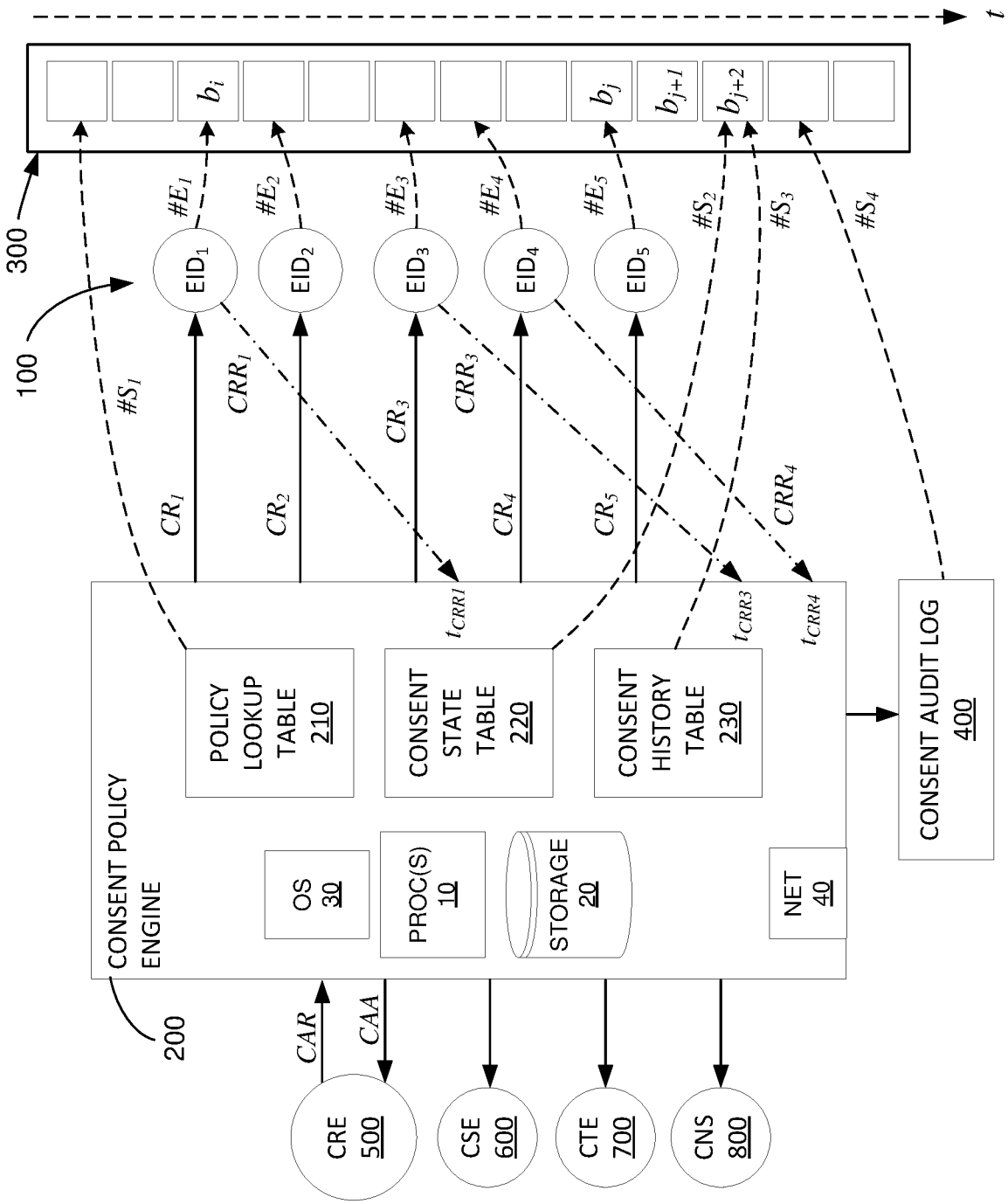

SYSTEM AND METHOD FOR REGISTERING MULTI-PARTY CONSENT

FIELD OF THE INVENTION

This invention relates to secure data structures, in particular, in the context of administering multi-party consent to some action.

BACKGROUND

Hardly a week or even day goes by that computer users in highly "digital" countries aren't asked to give their consent to something. Consent to share information. Consent to access information. Consent to some action or transaction.

Just two of countless common examples in which consent is required are: In the USA, almost every visit to a medical professional can have consent implications under the Health Insurance Portability and Accountability Act (HIPAA); and professional and commercials entities large and small, even outside the European Union, must now comply with the General Data Protection Regulation (GDPR) if they collect any of a broad class of information about EU-resident "data subjects" (persons).

Where consent is required, it is usually also important to later prove that consent was given, and given properly. Or not. This may be desired by the entity seeking consent, or by the entity giving it, or both, or by some third party. One common way is simply to record some indication of consent in a database, or to associate the indication with some record of an event, such as a data transfer. In most cases the records stored by such a solution may be easily backdated, forward-dated, faked, vulnerable to results of identity theft, etc., such that neither customers, clients, patients, users, etc., on the consent-giving side, nor auditing authorities and entities on a consent-verifying side, can adequately trust the records.

Problems such as these are sometimes compounded by the need for consent by multiple entities before some data event is allowed to occur, by time-limited consent windows, and by other restrictions placed on the consent procedure. Moreover, the need to better control, manage, and record some form of data activity extends beyond the context of consent—provable receipt (and/or transmission) of requests for action, orders for products and services, application approval processes, multi-task project tracking, and many other common activities have similar problems and would benefit from a solution that is more flexible yet offers better verifiability than what is currently available.

BRIEF DESCRIPTION OF THE DRAWING

FIG. 1 illustrates the main hardware and software components in an embodiment for registering multi-party consent, as well as many of the signals and messages passed between these components.

DETAILED DESCRIPTION

In broad terms, embodiments of this invention provide a system and method of operation that allow for flexible yet substantially irrefutable registration of communications relating to events, as well as well as the participating entities. What many of the terms in this summarizing sentence mean will become clearer from the description below, but some of the implications can be at least defined roughly here.

A "communication" may be anything that is transmitted digitally to trigger or otherwise affect occurrence of an event. Giving (or declining to give) consent for some action to take place is one example, and is, without limitation and by way of example only, the embodiment primarily described below to explain various features. As mentioned above, however, there is a wide variety of actions. A small sampling of other examples include submissions relating to approval of some form of application for some benefit, reporting of completion (or not) of some processing or manufacturing step, clearances and/or acknowledgements (such as requests and instructions transmitted between an air traffic control facility and an onboard flight control system or officer), instructions to perform (and/or acknowledgement of having performed) a financial or other commercial transaction, etc. Among other things, a communication could thus be a request (for example, to carry out an order or transaction), a response to a request (for example, to transfer personal data), or simply a submission (for example, reporting completion of a step in a process) not necessarily in response to a signal or message from any other entity. in other words, a communication may be either spontaneous, or responsive, and may combine elements of both.

Requests for consent may be made in any known manner. We've all seen them. For example, a medical provider may issue an explicit request under HIPAA, either by email, or by asking a patient to sign and confirm an electronic form in the doctor's office, or by checking a box in an online form, etc. Similarly, continued access to online content (including proprietary records) might be conditioned on a user giving consent online in accordance with GDPR or security requirements. As yet another example, a "Complete Order" icon on a vendor's payment page is a form of request for explicit authorization for payment for selected products or services.

An "event" is the action that corresponds to the communication. For example, if an entity requests permission to acquire and/or transfer personal data, and the subject (such as a GDPR "data subject") responds with consent, after recordation of this consent, the event might be actual acquisition or transfer of the data. As another example, if an entity in a process communicates that it has completed or approved some step in a process, then the event may be that the next entity/ies in the process are notified to begin their own related tasks.

Registration of data is "irrefutable" if, using existing computational methods, it would be impossible to alter correct indication of the registered data without the alteration being detectable.

As for flexibility, this feature of different embodiments will be readily understandable from the description below, but, depending on the embodiment, includes such characteristics as the ability to implement multi-party consent and the ability to provably revoke consent. As mentioned above, consent is only one instance of "communication" that embodiments may make possible. In multi-party situations, consent is anticipated to be a common use for embodiments of this invention, but this is not limiting. For example, indication of completion of some set of sub-tasks by different entities might be required before a task may be registered as completed, or completed submission of some set of documents may be required before some transaction may proceed, etc. The term "consent" may thus be viewed in a generalized sense of any indication about anything that is required in order for something to become permitted, possible, or undertaken. Embodiments of the invention may thus also be used in situations where, for example, a customer is ordering (a "request") a product, whose fulfillment requires more than one entity's approval ("consent"), such as both Finance and Shipping departments, where a manufacturer needs consent of Customs, Tax, and Defense agencies before exporting some high-tech product, etc.

"Blockchain"

Although the term "blockchain" itself, as well as related terms, do not yet have universally accepted definitions, typically a "blockchain" is understood as being a data structure comprising a series of usually (but not necessarily) cryptographically linked, time-stamped blocks $b_i, \ldots, b_j$, $b_{j+1}, b_{j+2}, b_{j+3}, \ldots$, where each block includes data corresponding to one or more transactions, hashed together with linking data, such as the hash of some data and/or metadata of at least one preceding block. The blockchain can then be used to create a ledger, which is typically an append-only database.

Some blockchain variants involve distribution and consensus, that is, copies of the blockchain are distributed to several entities, which then follow a procedure to "agree" on what data is to be allowed to constitute the next block. Many of the blockchains used for cryptocurrencies follow this model, for example, since they, usually by design philosophy, wish to avoid any central authority. In other configurations, a single entity may control access to a proprietary blockchain according to its own rules; governments, banks, enterprises, etc., will, for example, usually not want the operation of their blockchains to depend on consensus among distributed, often anonymous outside entities. In either case, once data is entered into a block of the chain, the entry is essentially irrefutable, that is, non-repudiatable, since any tampering with the data would be reflected in the chained hash calculations and thus easily detected.

One current point of dispute when it comes to the concept of a "blockchain" is whether, by definition, any entity may be allowed to submit blocks to and verify blocks in the blockchain, possibly only upon meeting some proof-of-work (such as Bitcoin's "mining"), or proof-of-stake requirement, or whether the entities that may submit to and verify blocks in the data structure must be permissioned by some central authority. In other words, there is dispute as to whether "blockchain" by definition implies "open" or not. Embodiments of this invention do not presuppose or require either definition, although a particularly advantageous form of blockchain (based on the Guardtime® infrastructure) is described below.

Multi-Party Consent

In embodiments of the invention, a blockchain is used to register and administer dynamic consent wherein the multiple involved parties can freely approve or withdraw their consent at any time, while staying informed of how their data is being used and by whom. Depending on the embodiment, the blockchain is used to register consents from users; the blockchain may then keep track of consent provenance as well as provide access control measures. Embodiments may also enable unequal consent "weighting" and/or include a consent tree that may also implement risk scoring, that is, a hierarchical consent mechanism. To better understand this general summary, see FIG. 1.

As FIG. 1 shows, one or more entities 100 (identified in the FIGURE as $EID_1$-$EID_5$) interact with a blockchain 300 under the control of a consent policy engine 200. Entities may be of any form, such as separate computer systems, separate users of a common system, separate processes executing within a single system, separate routines within a single application, separate virtual machines, etc., or any combination, as long as the entity is able to communicate digitally with the consent policy engine.

The consent policy engine (CPE) may include components such as a policy lookup table 210, a consent state table 220, and a consent history table 230, all of which may be implemented as data structures stored in any known format in whichever volatile or non-volatile storage component is included in the CPE. The CPE will include standard hardware and software components such as one or more processors 10, volatile and/or non-volatile storage 20 such as disk (solid state or otherwise) storage, RAM, etc., in which to store both data and the processor-executable code used to carry out the operations of the method described below, some form of operating system 30 and/or, in virtualized systems, some form of hypervisor, and some form of network interface device 40 enabling the CPE 200 to communicate over network(s) with entities and whichever system stores the blockchain 300. Other entities and systems described will be similarly configured with known hardware and software components enabling them to execute stored code to perform the various processing steps described below.

The blockchain itself may be stored in at least one computer system, which may, but need not be, the same as the system in which the CPE is implemented. For example, a single CPE could be implemented within a server that is available to more than one client, with different, respective portions of the tables 210, 220, 230 for each client, and possibly controlling access to more than one respective blockchain. The functions of the CPE could also be implemented using a distributed "cloud" computing arrangement.

Assume now that some entity wishes that some action or change of state of some object (physical or digital) should be carried out. For example, via a server, a medical facility may request HIPAA permission, a military aircraft may request permission to carry out some mission or a civilian aircraft may request approval of a flight plan, a bank may request permission to transfer data in compliance with GDPR, a school may need to determine whether to issue a certificate of completion of a course of study, a manufacturer may request clearance to move a part farther along in a supply chain, or any of countless other examples. Assume further that, in each of these instances, more than one entity may be authorized to participate in the decision as to whether to grant or deny the request. Embodiments that implement multi-party consent may use a general method to apply consent actions on receipt of any events that require action or a state change on objects associated with some entity (where that entity could be a person, an Artificial Intelligence (AI) routine, or a process). When a consent request is received, it may be forwarded to one or more authorized "voters", who may issue acknowledgements to permit of deny the requests.

See FIG. 1, which illustrates both the main components of embodiments, and also some of the information flow (which may be signals passed over any conventional network). In FIG. 1, various components, entities, and messages/signals/data transfer are as follows:

Consent Action Request (CAR): A message that specifies the consent action required, using any agreed upon format and data types. A CAR may initiate the process of gathering, validating, confirming and recording consent to an action. A Consent Action Request (CAR) request may contain primitives such as:

The request type, which may include arbitrary policy group metadata that can be used by the policy engine to decide which members of a Consent Voting Group (see below) include in voting Identity of the requester—the "entity ID" (EID)—that is making the request Identity of requestee, which may be the requester, or other EID if the request is "on behalf of"

The action required (for example, move, delete, copy, archive, authorize, etc.)

The target object(s) on the action required (e.g., file, image, credit card record, medical record, mission or transaction specification, product in supply chain, etc.) The target object be a single entity, or a group of related entities for which the consent action is requested (for example a medical image, or all images related to a specific illness or case). The scope of this object grouping may be determined through metadata specified within the CAR Timeframe for a valid response (time window, or indefinite)

Any other, or different, information chosen by the system designer according to the type of action required. One of the primitives in the request could be an indication of which other primitives will be required for requests of the current type.

Consent Action Acknowledgement (CAA): When an entity issues a CAR, a signal acknowledging this request is preferably returned to the requesting entity.

Consent Policy Engine (CPE) 200: This software component includes data structures (210, 220, 230) that hold the active set of policies, states, and histories. The CPE determines the actions taken on receipt of a Consent Action Request (CAR). This is effectively a matching engine for determining whether a received CAR can be satisfied by CVGs and CVPs. The processing components of the CPE also execute the code that defines the various routines and processes described herein.

Consent Policy Table (CPT) or Policy Lookup Table 210: Holds the active state of all policies (rules), their subjects, targets and any time bounds or associated conditions. Any known data structure and format may be used to implement the CPT.

Consent State Table (CST) 220: Holds the active state of all policy decisions, their subjects, targets and any time bounds or associated conditions. As with the CPT, any known data structure and format may be used to implement the CST.

Consent History Table (CHT) 230: Holds the historical state of all CST state changes, enabling a complete provenance to be derived for all consent histories, for example, in the form of a provenance graph for each CAR. As with other tables and logs, any known data structure and format may be used to implement the CHT, which may also be combined with the CST; for example, the CHT could store indications of all state changes, with the most current state entry corresponding to the CST.

Consent Audit Log (CAL) 400: This data structure may be included to store data that describes the historical state of all actions and events invoked by the CPE. All events are preferably registered in the blockchain.

Consent Voting Policies (CVP): Policies will generally be provided and organized according to consent action requests. In other words, a request for a certain action will generally trigger application of a particular policy. For example, all requests under HIPAA may need to follow a certain policy. It may also be possible to set policies, for example, by time, by consent group, by consent objects, by consent states, by geographic region, by voting power, etc. All policies may be stored in any known data structure in the CPE 200.

Consent Requesting Entity (CRE) 500: The entity from which a CAR originates. A CRE could be a person, process, or a sufficiently equipped AI entity. A CRE may also have an identity token registered in the blockchain.

Consent Voting Entity (CVE): A member of a CVG that may "vote" and thereby participate in determining whether adequate consent has been given. A voting entity could be a person, a sufficiently intelligent AI system, a process, etc. In some implementations, it may also be permitted for a CVE to designate a "proxy" (who votes as instructed by the principle) or "delegation" (who decides how to vote on behalf of the principle) entity—collectively, a "representative" entity—which then performs the functions of the CVE; such designation may be made in any known manner, after proper identification by the CVE, and indication of this designation is preferably stored in any data structure within the CPE 200 and in the blockchain 300. The designation could be make revocable or irrevocable and, in the case of revocation, transfer of voting authority back to the CVE is preferably also registered in the engine 200 and blockchain 300. In a generalized case, not only the votes of entities may be weighted, but also the entity itself may be able to assign a non-binary value to a vote. In FIG. 1, the entities 100 with IDs $EID_1$-$EID_5$ are, by way of example, shown as being the CVEs comprising a voting group. As is explained elsewhere in this disclosure, however, this doesn't mean the entities 100 are necessarily distinct from other entities shown in FIG. 1; in other words, the layout of FIG. 1 is also "functional".

In a simple binary case, an entity could vote either "yes" or "no" to consent and all entities could have equal voting "power". In other cases, the vote of one or more entities could have a higher weight and thus greater influence in the consent decision. As one example, the weight of a consent vote could be a function of the number of shares owned by each respective party. Similarly, a voter on a higher level in a hierarchy (such as a vice president relative to a middle level manager) could "count" more, or a voter that represents a more important interest or critical aspect of a common project.

Weighted or not, votes may also be non-binary. As an example of weighted, non-binary voting, assume that an embodiment of the invention is used to determine whether a candidate in a course of study should receive a diploma, license, etc. Some courses might be graded on a scale of 0 to 100, whereas other courses might be pass/fail, and some courses (voters) may be considered to have higher relevance (weight) than others. Expressed abstractly, one example expression of a policy for a decision (such as consent) might be:

$$\text{decision=YES if } (\Sigma_i w_i * e_1) \geq T \text{ AND \{other factors\}}$$

where

T is a decision threshold value $e_i$ is a consent value for each entity i, such as 0,1 for binary votes or any range or set of possible values for non-binary votes. Depending on how one wishes to formulate a policy, it would even be possible for one or more consent values to be negative, for example, to reflect a "no" vote, as opposed to a value of 0.

$w_i$ is a weight for each entity consent value $e_i$. In addition to being set and adjusted according to the relative importance of each entity's vote, the weights might also be adjusted according to whether an entity voted "no" as opposed to not giving a vote at all, either because of unavailability or a deliberate decision to abstain.

other factors may include such considerations as whether one or more votes has occurred after, before, or conditioned on time, or in a required order, etc., or a combination of such factors.

As for time, consent and also the proxy/delegation period could be set to expire after a specified absolute or elapsed time, or so that it does not become active until after a specified absolute or elapsed time, or a combination of both, such that a time range of validity is set. In some implementations the weights themselves could be made a function of time, so as, for example, to relatively reward promptness.

Decisions, that is, consent actions, might also be based on a particular use condition/request purpose, or type of requester. For example, one of the other factors might be that data is to be shared with a healthcare specialist (thus, allowed), but not with a medical research entity (thus, not allowed).

Yet another couple examples of the substantially unlimited number of choices of possible other factors might be location or system type. For example, there could be a requirement that the "vote" coming from one or more entities must come from locations within or outside of some physical, logical, or organizational boundary, such as from IP addresses within the USA, or through a company-provided VPN, or only through specified hard-wired connections, etc., or from certain departments in an organization. Similarly, there could be a policy requirement that only certain types of processing systems be used to vote, which could be enforced by querying known information in the systems. To establish the ID of an entity participating in any aspect of the consent arrangement, it would be possible to use any known method, such as public/private keys, tokens (including time-limited), etc.

Still other additional consent parameters/factors could be transaction and/or data type. For example, consent might be granted to access a bank account, but only for the purposes of deposits and viewing (but not withdrawals), or consent to medical records could be granted for a particular set of records (or fields within database records), such as all images relating to osteoporosis or scan images.

Any combination of other factors could be included in a given policy.

Sometimes, the data that is the subject of a CAR might change before consent relating to it has expired. Changes may be detected, for example, by verifying data signatures for the current state of the data before any action relating to it may be undertaken. For example, if a hash or KSI® signature (see below) of the data in its current state does not match the hash/signature most recently computed for it, then some change may be assumed to have occurred. Different policies may be adopted to handle this situation. In one simple case, consent may be assumed to apply to the data (for example, whatever is in the same indicated database record or fields, etc.) regardless of any changes that may have occurred, as long as the consent is valid—consent could thus be "inherited" for even changed data. Another option would be to require renewal of consent, essentially re-running the consent protocols. Consent in the case of change could also be "fine-tuned" to be a hybrid: For example, certain changes defined to be non-essential could be "inheritable" whereas changes to other portions of a data set could require renewed consent.

Decision policies do not need to be based on any weighted summation formula at all, but could be expressed in any other manner. As just one of many other possibilities, a policy could be decision=YES if (e1 OR e2 OR (e3 AND e4)) where ei=TRUE if entity ei gives consent and FALSE if the entity either votes "no" or doesn't participate at all.

In the case of some types of CAR, the identity of the requestor may be an other factor that might override the decisions of all CVEs, or have higher weight, such that no other "consent" is required at all to have an action performed. For example, under GDPR, a "data subject" may need no other entity's consent to have certain records deleted, but the blockchain-registration features of embodiments will then be useful for irrefutably recording not only the request, but also the steps taken to delete the records and the acknowledgement of ultimate deletion. In some other cases, the "request" of a CEO or Commander-in-Chief, etc., may override any need for obtaining consent. Viewed differently, in these cases, the CRE is also a CVE with a voting weight or priority that alone is sufficient for a decision.

An identity token of any known type is preferably registered in the blockchain for each CVE 100. In FIG. 1, for example, tokens $\#E_1$-$\#E_5$ are illustrated as being registered in the blockchain 300 for the entities with IDs $EID_1$-$EID_5$, respectively. The token may include associated entity attributes such as, for example, entity type (human, AI entity, process), rank (hierarchy), trust level (for example, on a 0.0-1.0 or 0-100 scale). These attributes may be used by matching algorithms within the CPE 200 to determine whether a CAR can be matched by a CVG.

Consent Voting Group (CVG): This is the set of parties, that is, CVEs, that, depending on the policy, are required or allowed to vote concerning a decision.

Consent Request (CR): Once the policy engine determines, according to the appropriate policy, which entities are to be polled for their consent decisions, a CR is sent to each of those entities to get their decision. In FIG. 1, $CR_1$-$CR_5$ are shown as being sent to entities with IDs $EID_1$-$EID_5$, respectively.

Consent Request Response (CRR): An entity may return this message to indicate that it has received the consent request CR. In one embodiment, every entity to which a CR is sent may be required at least to acknowledge receipt of it, regardless of its decision. In some situations, however, some entities may either not receive the CR at all, or may not be available to process it; for example, it may be outside normal business hours for some entities, or the systems (such as mobile phones) through which they are expected to communicate may not be operational, etc. By way of example, in FIG. 1, entities with IDs $EID_1$, $EID_3$ and $EID_4$ are illustrated as having acknowledged their respective CRs with affirmative decisions at times $t_{CRR1}$, $t_{CRR3}$ and $t_{CRR4}$, respectively. The other entities with IDs $EID_2$ and $EID_3$ either did not respond, or responded negatively.

Consent Subject Entity (CSE) 600: The person, process, sufficiently equipped AI entity, etc., to whom the requested data belongs (or is control of the data) and to whom consent is to be given to do something with it. The CSE is thus the subject of the CAR issued by the requesting entity (which may be the same EID as the CRE, or another EID if the CRE is requesting consent on behalf of another entity). A CSE is thus the entity whose action is contingent on the decision. For example, one entity (acting as the CRE) might request transfer of data from a CSE (which can be the same as the CRE). A CSE may also have an identity token registered in the blockchain. Thus, if the CPE has determined that all of the conditions for consent to the CAR have been met, the CPE may signal to the CSE to carry out the requested action.

Consent Target Entity (CTE) 700: The entity to whom consent is being granted for the object to be transferred to, etc. The target of the CAR, for example the host organization issuing the CAR, or a 3$^{rd}$ party organization that the CAR is requesting action for. As one example, the CTE might be a 3$^{rd}$ party processor for Personally Identifiable Information (PII) data held on a CSE. A CTE may also have an identity token registered in the blockchain. In many cases, the CSE and CTE may be the same entity.

To help better understand the terms CRE, CSE, and CTE, consider a doctor from hospital Z granting consent to hospital Y to access Patient X's records. In this case, doctor/hospital Z is the CRE, Y is the CTE (target) and X the CSE. There are cases where the CRE and CTE could be the same; for example, if hospital Y is requesting consent to pull records of X, Y will be both the CRE and CTE, whereas X will be the CSE.

Consent Actions (CA): Actions that are requested in a CAR (e.g. create, move, share, delete, copy, archive, pseudonymize, obfuscate, anonymize, initiate, stop, etc.).

Consent Action Conditions (CAC): Metadata held in a CAR that specifies the conditions for the actions requested in a CAR on CAOs (for example, which 3$^{rd}$ parties a patient is willing to share medical data with, and for how long, etc.). CACs can thus be used to change a consent policy "dynamically", that is, in addition to any pre-stored policy rules.

Consent Action Object (CAO): Objects that are the target of a CAR (for example, entities, workflows, files, images, transactions, data objects, medical records).

Consent Notification Subscribers (CNS) 800: An entity (local or 3$^{rd}$ party) that subscribes to state change notifications from the CPE. For example an insurance company may wish to be notified of any changes in the status, such as address, driving arrest record, etc., of a policy-holder.

Entity Identity (EID): All entities (CVE plus CSE and CRE) preferably have an identity token (such as, for example, a public key, certificate, etc.) registered (in any known manner) in the blockchain so as to reduce or eliminate the possibility that communications are repudiated. In FIG. 1, examples of such tokens have the prefix "#".

Now see FIG. 1, which illustrates an example of one embodiment. Just by way of example, FIG. 1 shows one CRE 500 as being separate from the entities 100, from the CTE (one shown as 600), from the policy engine 200, etc. This is just to illustrate certain possible signal flows; depending on the situation, a CRE might also be a member of a voting group or a CSE 600 or CTE 700, and/or a CNS 800. The same system, person, process, etc., may thus be any, any combination of, or even all of the entities 100, 500, 600, 700, 800; indeed, even the policy engine 200 itself might in some situations want or need to request some action, and might thus itself form a CRE 500.

When a CAR is received by the consent policy engine 200, the CPE performs a lookup in the policy lookup table 210 to assess whether the request is valid and reasonable. Part of that validation is preferably a check that any EIDs present are registered in the blockchain. If not, the request may be denied, or a message may be sent to any unregistered entities to properly register themselves.

If validation is successful, the policy engine 200 may determine the appropriate members of a Consent Voting Group to consult for this request type, and issue requests to each entity in the group, including metadata on the request, action, source EIDs, any time restrictions, etc.

Each CVE should preferably either positively or negatively acknowledge the request, if possible. Each response preferably contains the EID of the voting entity, which the policy engine 200 may check to establish its registration state in the blockchain, together with any other policies (such as time validity and whether the object and actions are reasonable), that is, the CPE satisfies the requirements of all relevant policies for the request.

All policies used may be stored in any chosen format in the policy table 210, whose state may also be registered in the blockchain, for example, initially, and whenever a configuration state change occurs (such as a new policy added, or a policy modified). In FIG. 1, for example, a corresponding state indicator #S$_1$ is illustrated as being registered in the blockchain 300. Any chosen indicator may be used, such as a simple hash of the contents of the table. For reasons explained below, however, a particularly advantageous state indicator would be a KSI® signature using the Guardtime® infrastructure described below. Before requesting consent, it would thus be possible to include a step of verifying that the current contents (either in whole, or just the currently relevant policy entry) of the policy table themselves are valid, for example, by comparing the immediate state of the table 210 with what was used to generate the most recent indicator/token #S$_1$. Using a KSI® signature of the contents of the table as or to generate #S$_1$ would then have the benefit of "built-in" timestamping, which can also be used to help locate the correct blockchain block.

The CST 220 may also store such state information; this provides easy lookup, but with the blockchain backing it for confirmation. The CST 220 preferably maintains state on all decisions made by the CPE 200, by recording the active state on all consent actions granted, and the subjects and targets of those consent requests.

The CHT 230 may then record state changes to the CST 220, for example in the form of a provenance graph or list or tree over time. As just one example, an original request for some action could be stored as a "root" node of a provenance graph, and each subsequent action, such as the consent decision given by each member of a consent group, could be indicated as a respective node of the graph, connected by "branches" to an immediately higher node, or linked (as in a blockchain, or otherwise) to an immediately preceding action (such as a different entity's vote, or an acknowledgement of a request or its completion, etc.), possibly along with a pointer to the block in the blockchain in which each such action is registered. Actions following the voting may also be stored as respective graph nodes, with respective blockchain pointers. Storing such a provenance graph or list for each request-action sequence would provide a convenient and easily searched and verifiable record of all the events encoded in the various graph or list nodes. It may also avoid the need to scan the blockchain for entries corresponding to a sequence of events.

The nodes of the provenance graph may also include information derived from one or more immediately higher-order "parent" nodes, such as a hash of some or all of the data or metadata in the parent node. In other words, the branches of the provenance graph could also be structured like separate blockchains. This would prevent tampering with the graph later.

Any authorized 3$^{rd}$ party entity may then be able to query the policy engine 200 on the state. All active policy action states may thus be held in the CST 220 so that any queries on consent status can be handled unambiguously. The state of the state table itself may also be registered in the blockchain in the event of any state change addition or removal. One way to register such state (or any other information described herein) is to hash it and record the hash; another, more secure and intrinsically time-stamped option is to submit the state table contents as input to a Guardtime signature infrastructure (see below) and to store the associated signature. One advantage of using a blockchain configured using a Guardtime infrastructure (see below) is that raw data need never be recorded in the blockchain at all, such that if consent is revoked, no decipherable version of the corresponding information relating to a request or its subject will be available even if the blockchain as such is left unaltered.

Note that request for deletion of data relating to some previous entry event is also an event in itself, which may be processed and registered in the blockchain as other events, including creating a corresponding entry in a provenance graph or list. Similarly, an entity that previously consented may initiate a revocation action, that is, withdraw consent. This too may be processed as other CARs, possibly according to a policy that doesn't require any other entity's consent for such revocation. In such cases, whether the previously permitted action may continue, or must be stopped or revoked (such as consent for a medical procedure) could be determined by re-evaluating the original policy to see if the change of "vote" would affect the decision, a totally new consent procedure could be initiated, the action could be automatically halted by default, or any other preferred procedure could be followed.

Additional policies may be installed in the CPE 200 that require 3$^{rd}$ parties (CNS) to be notified of events, with instructions on how to handle any consent objection or instructions they act upon. Any unsolicited queries from 3$^{rd}$ parties on the state of policies associated with removed entities will also receive such instruction. Any such notifications and instruction may also be logged.

Policies may be installed in the CPE that determine behavior on inheritance rules on objects associated with entities, using the ranking attribute of each CVE. One generalized example of such a policy is described above. Here, a "rank" may be an indication of the weight of the vote of an entity; thus, weights may be used to establish a hierarchy. Instead of or in addition to weights, however, a simple table of rank may be used, with no need to compute any sum of weighted entities' votes. To give just one example here, a simple consent decision might be based on receiving 2×Rank 1 CVE confirmations, or 1×Rank 1 plus 2×Rank 2 CVE confirmations, within 30 seconds from the time a Consent Request (CR) was issued to a CVG.

The policy engine 200 preferably maintains (for example, in table 220) the state information of each request and, if necessary, deletes requests that have timed out, in which case it may also send a negative acknowledgement to the requester.

As positive responses are returned, policy logic within the CPE 200 may determine whether enough voting weight has been provided to make a decision, and that the request time bounds (if specified) or other factors have been followed. The CPE 200 thus acts as a matching engine for determining whether a received CAR can be satisfied by CVGs and CVPs. The routines executed to perform matching (according to stored policies) may be configurable on a per-rule basis, and may take into account CVE attributes such as rank, type and trust level to determine whether a decision threshold has been met or exceeded.

If the CAR request conditions are met/not met, a positive/negative consent acknowledgement may be sent to the requester. This decision outcome may then be registered in the consent state table 220 and a consent history table 230, and logged in a consent audit log 400. As shown in FIG. 1, the log 400 may be implemented separate from the policy engine 200, for example, located within some supervisory entity, but could also be implemented within the policy engine 200 itself. All events are preferably registered (for example, using a KSI® signature) in the blockchain 300 using whatever mechanism is provided for the chosen blockchain type. In FIG. 1, for example, a state indicator #$S_2$ is illustrated as being registered in the blockchain 300, which may indicate either the most recent event, or the entire state of the table 220 after the most recent event. Similarly, state indicators #$S_3$ and #$S_4$ are illustrated as being registered in the blockchain for the table 230 and the log 400, respectively.

Either of the tables 220, 230, or some other table in the CPE 200, may also be used to store such data as CARs, CAAs, CRs, CRRs, etc., preferably in addition to these signals being registered in the blockchain. Storing this information in the engine tables will allow entities to easily query it, while registering it in the blockchain will provide irrefutable accountability.

If consent is properly given for a request, the CPE may message the CTE to perform whatever action underlies the request; alternatively, the CPE may message the CTE or any other entity simply that consent has been properly given and registered in the blockchain, whereupon that entity may proceed however it wishes or is programmed to do once it has consent.

Decision notifications may also be triggered at the CST and forwarded to any 3$^{rd}$ parties that subscribe to consent state changes. These notifications may also be logged in the CST 220, CHT 230 and CAL 400 and registered in the blockchain, so as to provide irrefutable evidence of a complete provenance chain on every consent decision, change, outcome. Any or all notifications may be sent to Consent Notification Subscribers (CNS) 800, which may be any entities.

All consent requests and consent responses may be logged, for example in the log 400, with each event in the log preferably also being registered in the blockchain. Together with the recorded consent histories, this provides an immutable audit trail and provenance graph for every consent decision, every change of policy, and every notification sent regarding consent.

In a simple case, the entities that request an action, that are allowed/required to vote on consent, and that are the targets of the action, are substantially fixed. This is not necessary in all embodiments. As one embodiment, representative ("proxy", "delegation", etc.) authorization could be stored in the CPE 200, for example, as part of the lookup table 210, that indicates an either/or option for such entities. Thus, a patient could have given authorization for his spouse to also grant consent for transfer of medical data by the family physician or a designated specialist to yet another specialist or an insurance company. As another example, such an embodiment may be used to implement an electronic advanced directive, such that a patient's spouse, or other designated agent, would be authorized to consent to continuing or stopping medical procedures in case the patient is unable to do so. Since the IDs of the entities (patient, spouse), the acts of consent, and any actions taken by the healthcare providers are preferably registered in the blockchain, such an electronic advanced directive and all actions taken can be irrefutably registered and can be audited later.

It would also be possible for a representative (proxy, delegate, etc.) to be appointed and registered in the blockchain for a CTE, in particular where "consent" relates to performance of an action that does not necessarily or primarily involve data transfer. For example, a consent-dependent request could be submitted for purchase and shipment of a product, but the vendor (the intended CTE) may have delegated responsibility for fulfillment of the order to a different entity that has the product warehoused.

In some cases, a policy may be created in which certain entity IDs are specifically excluded, that is, such IDs may not be included in a request. For example, in context of healthcare, assume that a hospital has a server that stores patient data. It would then be possible for the hospital to get consent from patients for a medical research team to access data, but on the condition that it is provided anonymously, that is, without any patient IDs being included. Consent would thus be directed to a portion of the stored data set, namely, the data itself, but not to any ID information; alternatively, ID information could be encrypted, with the research team not having the decryption key. As one example, the medical research team could then runs analytics on the accessible data and see that p % of people over age are overweight, or have a certain illness, etc. Using such an access-based embodiment, it would not be necessary for the hospital to actually transfer data to the researchers, since the consent rules themselves would act as a filter on what the researchers can see.

The policy for adequate consent may also be made dynamic in ways other than time, for example, a change of state of some other data, available entities, etc. As one example, consent could be contingent on no change of state in PII, such that every update of such PII requires renewed consent. It would also be possible to have an "until explicitly revoked" consent policy, such that consent, once given, remains active, even after changes of PII, until a revocation action is requested.

Yet another consent policy could be "hierarchical", such that, if the required number and type of voting entities at a lower level are not available, some number and type of entities at a higher or secondary level could be queried for consent.

In the description above, merely by way of example and because it is likely to be a common implementation choice, the policy corresponding to a given CAR is mentioned as being dependent on the entities in the consent voting group. It would also be possible to implement policies that involve a similar form of "voting" when it comes to consent action requests. For example, before consent to undertake an action is even solicited from the entities in the corresponding voting group (which might even include one or more requestors as well), a policy could require that some threshold number of CREs, or some number from predefined categories, submit the same request. For example, the CPE 200 could follow a policy according to which no consent is requested for an action relating to a child's medical treatment (or transfer of medical records, etc.) until both parents submit a request for the treatment. Even such multi-CRE policies could involve weighting of the different CREs' requests. All such requests could also be required to be received by a cut-off time, or within some time window, or from (or not from) specified physical or logical or hierarchical (such as company department) locations, etc.

Embodiments may also be provided with privacy-preserving features. One choice is to pseudonymize personally identifiable information about the consent group members (for example, ID and other chosen, pertinent metadata) and register the pseudonymized information in the blockchain. Before each consent vote, the pseudonymized ID may then be verified via the blockchain.

Another choice is to provide a consent-token based access control scheme, in which a consent token is generated each time consent is granted and shared with the relevant entities, for example, the entity to which consent is being given for access, the entity which is controlling access, etc. One way to generate such a token may be to compute it as a function (hashed, for example) of the associated consent metadata. For example, party X might give consent to party Y, which gives Y a right to access certain portions of X's bank account information, for example, for a period, for example, one month, or for some number (such as only one) of accesses or transactions. In this case, X will generate a lifetime-based consent token and give it to both Y and the bank (or alternatively the bank requests X for the token when Y makes an access request), which Y must also present to complete any access. Once X's consent token expires, any other consent tokens that may have been derived from it become invalidated. A mapping of the consent token to each of the members in the consent tree may be maintained in a database. Various cryptographic operations, including but not limited to hashing, may be used to derive an encryption key which may be used to encrypt the information that X has granted for Y to access. Other pieces of sensitive information belonging to X, in this case, may be encrypted with other pre-defined keys, to which Y and other parties do not have access. Once the lifetime of X's token expires, the corresponding key may be automatically revoked/invalidated, thus limiting the need to store these keys for extended periods of time or to maintain revocation lists. This embodiment implements a form of access control in that a party cannot gain access to the database/blockchain other than through an authorizing party.

Whenever an action is taken regarding the data that is the subject of a request, such as giving or revoking consent to a CAR, the requested action by the CSE, receipt by a CTE, etc., a "receipt" may also be generated and stored in any data structure within the engine 200 and preferably also in the blockchain 300. One example of such a receipt is a digital signature, such as a KSI signature, for either the data involved, and/or consent metadata, etc. The receipt may alternatively be, or include, a pointer or other data relating to the corresponding blockchain entry, for example, an identifier of the block in which the receipt is encoded, along with any metadata necessary to retrieve and interpret it. The receipt may then be presented to an end user or other verifying entity, which will then later be able to query the blockchain and verify/prove receipt.

There are countless use cases for a system that implements multi-party consent such as embodiments of this invention. Here are just four relatively straightforward and simple examples:

Example Use Case 1—"Simple Policy"

In a very simple case, an employee might request to have all processing stopped on a specific workflow. In this case both the CRE and CSE are the same, and the request is anchored in time in the blockchain. The transaction registered in the blockchain may include all of the consent action metadata plus the ID token of the CRE and CSE (here the same).

Example Use Case 2—"Four-Eyes Policy"

In this simple case, two human actors of sufficient rank must provide consent for a specific target object, or object group, within a specific time window.

Example Use Case 3—Time-Dependent Consent

Here, the Consent Group may vary based on time. For example:

Business hours Consent Group=Alice+Bob
Out of normal hours Consent Group=Bob+Chris+David
Consent must be completed within time window $T_w$ else re-voting is required where $T_w$ starts at the point where the CR is issued Objects referred to may even have geospatial restrictions on
Movement (source-destination)
Processing scope
Rights to Copy
Rights or Need to Archive
Deletion
Update
Data handling (encrypted only on storage or plain text allowed, pseudonymised, memory only processing etc.)

Example Use Case 4—AI Involvement

Similar to the previous use case, with mixed human and AI actors. In this example, AI and human entities may be assigned different ranks depending on levels of trust or expertise.

Guardtime® Calendar as Blockchain 300

In a preferred embodiment, the blockchain 300 is implemented using the data signature infrastructure developed and marketed under the name KSI® by Guardtime AS of Tallinn, Estonia. This system is described in general in U.S. Pat. No. 8,719,576 (also Buldas, et al., "Document verification with distributed calendar infrastructure"). In summary, for each of a sequence of calendar periods (typically related one-to-one with physical time units, such as one second), the Guardtime infrastructure takes digital input records as inputs. These are then cryptographically hashed together in an iterative, preferably binary hash tree, ultimately yielding an uppermost hash value (a "calendar value") that encodes information in all the input records. This uppermost hash value is then entered into a "calendar", which is structured as a blockchain. The KSI system then may return a signature in the form of a vector, including, among other data, the values of sibling nodes in the hash tree that enable recomputation of the respective calendar value if a purported copy of the corresponding original input record is in fact identical to the original input record.

As long as it is formatted according to specification, almost any set of data, including concatenations or other combinations of multiple input parameters, may be submitted as the digital input records, which do not even have to comprise the same parameters. One advantage of the KSI system is that each calendar block, and thus each signature generated in the respective calendar time period, has an irrefutable relationship to the time the block was created. In other words, a KSI signature also acts as an irrefutable timestamp, since the signature itself encodes time to within the precision of the calendar period.

One other advantage of using a Guardtime infrastructure is that there is no need to store and maintain public/private (such as PKI) key pairs—the Guardtime system may be configured to be totally keyless except possibly for the purposes of identifying users or as temporary measures in some implementations in which calendar values are themselves combined in a Merkle tree structure for irrefutable publication. Another advantage is less apparent: Given the signature vector for a current, user-presented data record and knowledge of the hash function used in the hash tree, an entity will be able to verify (through hash computations as indicated by the signature vector) that a "candidate" record is correct even without having to access the signature/timestamping system at all.

Yet another advantage of the Guardtime infrastructure is that the digital input records that are submitted to the infrastructure for signature/timestamping do not need to be the "raw" data; rather, in most implementations, the raw data (such as a medical record) is optionally combined with other input information (for example, input server ID, user ID, location, EIDs, such as IDs of CRE, CSE, CTE, CVE, etc.) and then hashed. Given the nature of cryptographic hash functions, what gets input into the KSI system, and thus ultimately into the calendar blockchain, cannot be reconstructed from the hash, or from what is entered into the calendar blockchain. If an entity, in compliance with GDPR, for example, assures a user that his raw data has been "forgotten" in its database (an action that itself may be recorded in the blockchain), then the information encoded in the Guardtime KSI blockchain structure may remain as is, since it is impossible to deduce what raw data led to it. This is in contrast to many existing blockchain solutions, whose blocks include raw data: Deleting or altering any block in such a blockchain renders the chained linking data invalid; alternatively, creating a forked, that is, parallel blockchain path to accommodate a deletion weakens or destroys the security and trustworthiness of the system as a whole.

We claim:

1. A method for securely recording multi-party consent to performance of an action comprising:
   receiving from at least one consent requesting entity (CRE) a consent action request (CAR) corresponding to the action;
   matching the CAR with a consent policy;
   determining from the consent policy a plurality of consent voting entities (CVE) and confirming registration of an identity of each CVE in a blockchain;
   issuing to the CVEs a consent request (CR);
   receiving consent request responses (CRRs) from the CVEs;
   comparing the CRRs with at least one condition in the consent policy;
   compiling a representation of a state of the CRRs relative to the consent policy and registering the representation of the state of the CRRs in the blockchain;
   if the at least one condition is satisfied, signaling to a subject entity to perform the action corresponding to the CAR; and
   registering in the blockchain a state indication of performance of the action.

2. The method of claim 1, further comprising compiling, storing, and updating a data structure indicating changes of consent state over time.

3. The method of claim 2, in which the data structure is a provenance graph.

4. The method of claim 2, in which the data structure is a linked list ordered by time of occurrence of each change of consent state.

5. The method of claim 1, further comprising:
   compiling and maintaining a consent audit log of consent events from receipt of the CAR to performance of the action; and
   registering a state of the consent audit log in the blockchain.

6. The method of claim 1, in which comparing the consent request responses with at least one condition in the consent policy comprises evaluating a function of values of the CRRs.

7. The method of claim 6, in which the function of values of the CRRs weights the CRRs differently depending on the respective CVEs.

8. The method of claim 1, in which, if a predetermined number of CVEs is not available to respond to the CAR, determining from the consent policy a secondary plurality of CVEs to which to issue the CR and from which to receive CRRs.

9. The method of claim 1, in which the blockchain comprises blocks, each block being formed as a highest-level value of a tree data infrastructure having digital input records as lowest level inputs, said highest-level value being formed by iterative, pairwise cryptographic hashing from the lowest level inputs upward through the tree data infrastructure over a plurality of levels.

10. The method of claim 9, further comprising, upon each registration in the blockchain of any consent-related state information, applying said consent-related state information as one of the digital input records to the tree data infrastructure, and receiving from the tree data infrastructure a digital signature including recomputation parameters, said recomputation parameters including sibling node values in a directed path in the tree data infrastructure from the digital input record up to the current highest-level value, such that an arbitrary subsequent test digital record is considered authenticated relative to the corresponding digital input record if, applying the corresponding digital transformation to the test digital record and, using the recomputation parameters to recompute the node values up to a test value, the test value is equal to the highest-level value encoded in the signature.

11. The method of claim 1, further comprising:
receiving a consent revocation from at least one of the CVEs; and
registering an indication of the consent revocation in the blockchain.

12. The method of claim 1, in which the CAR is a demand for stored data to be deleted.

13. The method of claim 1, in which at least one of the condition(s) is time-dependent.

14. The method of claim 1, in which at least one of the condition(s) is dependent on the location of at least one of the CVEs.

15. The method of claim 1, in which at least one of the condition(s) is dependent on a number or type of CREs.

16. The method of claim 1, further comprising issuing a consent token corresponding to the CAR, and signaling to the subject entity to perform the action corresponding to the CAR only if the consent token is valid.

17. The method of claim 16, in which the consent token is time-limited.

18. The method of claim 16, in which validity of the consent token is dependent on at least one characteristic of data to which the action relates.

19. The method of claim 16, in which the consent token is invalidated upon a change in data to which the action relates.

20. The method of claim 16, further comprising repeating the steps of issuing to the CVEs the consent request (CR) and receiving consent request responses (CRRs) from the CVEs upon the change in data.

21. The method of claim 16, further comprising issuing a requester token in which the validity of the consent token is dependent on the validity of a requester-associated token.

22. The method of claim 1, further comprising registering in the blockchain a registration entity for at least one of the CVEs, said registration entity thereupon acting as the respective CVE for the purpose of making the respective CRR.

23. The method of claim 1, further comprising registering in the blockchain a registration entity for the CRE, said registration entity thereupon acting as the respective CRE for the purpose of making the respective CAR.

24. The method of claim 16, further comprising, upon completion of the action or any sub-steps of the action, registering a corresponding receipt in the blockchain.

25. The method of claim 1, in which the action is a access of data.

26. The method of claim 1, in which the action is transfer of data.

27. A system for securely recording multi-party consent to performance of an action comprising:
at least one processor;
at least one storage device provided for storing processor-executable code;
a blockchain, comprising a data structure of a plurality of cryptographically linked blocks;
a consent policy engine (CPE) comprising computer-executable code which, when executed on the at least one processor, is provided:
for receiving from at least one consent requesting entity (CRE) a consent action request (CAR) corresponding to the action;
for matching the CAR with a consent policy;
for determining from the consent policy a plurality of consent voting entities (CVE) and confirming registration of an identity of each CVE in the blockchain;
for issuing to the CVEs a consent request (CR);
for receiving consent request responses (CRRs) from the CVEs;
for comparing the CRRs with at least one condition in the consent policy;
for compiling a representation of a state of the CRRs relative to the consent policy and registering the representation of the state of the CRRs in the blockchain;
if the at least one condition is satisfied, for signaling to a subject entity to perform the action corresponding to the CAR; and
for registering in the blockchain a state indication of performance of the action.

28. The system of claim 27, in which the CPE is further provided for compiling, storing, and updating a data structure indicating changes of consent state over time.

29. The system of claim 28, in which the data structure is a provenance graph.

30. The system of claim 28, in which the data structure is a linked list ordered by time of occurrence of each change of consent state.

31. The system of claim 27, in which the CPE is further provided:
for and maintaining a consent audit log of consent events from receipt of the CAR to performance of the action; and
for registering a state of the consent audit log in the blockchain.

32. The system of claim 27, in which the CPE is further provided for comparing the consent request responses with at least one condition in the consent policy by evaluating a function of values of the CRRs.

33. The system of claim 32, in which the function of values of the CRRs weights the CRRs differently depending on the respective CVEs.

34. The system of claim 27, in which the CPE is further provided for determining from the consent policy a secondary plurality of CVEs to which to issue the CR and from which to receive CRRs if a predetermined number of CVEs is not available to respond to the CAR.

35. The system of claim 27, in which the blockchain comprises blocks, each block being formed as a highest-level value of a tree data infrastructure having digital input records as lowest level inputs, said highest-level value being formed by iterative, pairwise cryptographic hashing from the lowest level inputs upward through the tree data infrastructure over a plurality of levels.

36. The system of claim 35, in which the CPE is further provided for, upon each registration in the blockchain of any consent-related state information, for applying said consent-related state information as one of the digital input records to the tree data infrastructure, and receiving from the tree data infrastructure a digital signature including recomputation parameters, said recomputation parameters including sibling node values in a directed path in the tree data infrastructure from the digital input record up to the current highest-level value, such that an arbitrary subsequent test digital record is considered authenticated relative to the corresponding digital input record if, applying the corresponding digital transformation to the test digital record and, using the recomputation parameters to recompute the node values up to a test value, the test value is equal to the highest-level value encoded in the signature.

37. The system of claim 27, in which the CPE is further provided for:
    receiving a consent revocation from at least one of the CVEs; and
    registering an indication of the consent revocation in the blockchain.

38. The system of claim 27, in which the CAR is a demand for stored data to be deleted.

39. The system of claim 27, in which at least one of the condition(s) is time-dependent.

40. The system of claim 27, in which at least one of the condition(s) is dependent on the location of at least one of the CVEs.

41. The system of claim 27, in which at least one of the condition(s) is dependent on a number or type of CREs.

42. The system of claim 27, in which the CPE is further provided for issuing a consent token corresponding to the CAR, and for signaling to the subject entity to perform the action corresponding to the CAR only if the consent token is valid.

43. The system of claim 42, in which the consent token is time-limited.

44. The system of claim 42, in which validity of the consent token is dependent on at least one characteristic of data to which the action relates.

45. The system of claim 42, in which the CPE is further provided for invalidating the consent token upon a change in data to which the action relates.

46. The system of claim 42, in which the CPE is further provided for repeating the steps of issuing to the CVEs the consent request (CR) and receiving consent request responses (CRRs) from the CVEs upon the change in data.

47. The system of claim 42, in which the CPE is further provided for issuing a requester token in which the validity of the consent token is dependent on the validity of a requester-associated token.

48. The system of claim 27, in which the CPE is further provided for registering in the blockchain a representative entity for at least one of the CVEs, said representative entity thereupon acting as the respective CVE for the purpose of making the respective CRR.

49. The system of claim 27, in which the CPE is further provided for registering in the blockchain a representative entity for the CRE, said representative entity thereupon acting as the respective CRE for the purpose of making the respective CAR.

50. The system of claim 27, in which the CPE is further provided for registering a corresponding receipt in the blockchain upon completion of the action or any sub-steps of the action.

51. The system of claim 27, in which the action is a access of data.

52. The system of claim 27, in which the action is transfer of data.

* * * * *